H. A. SCHERMERHORN.
SPRING WHEEL.
APPLICATION FILED JAN. 25, 1912.

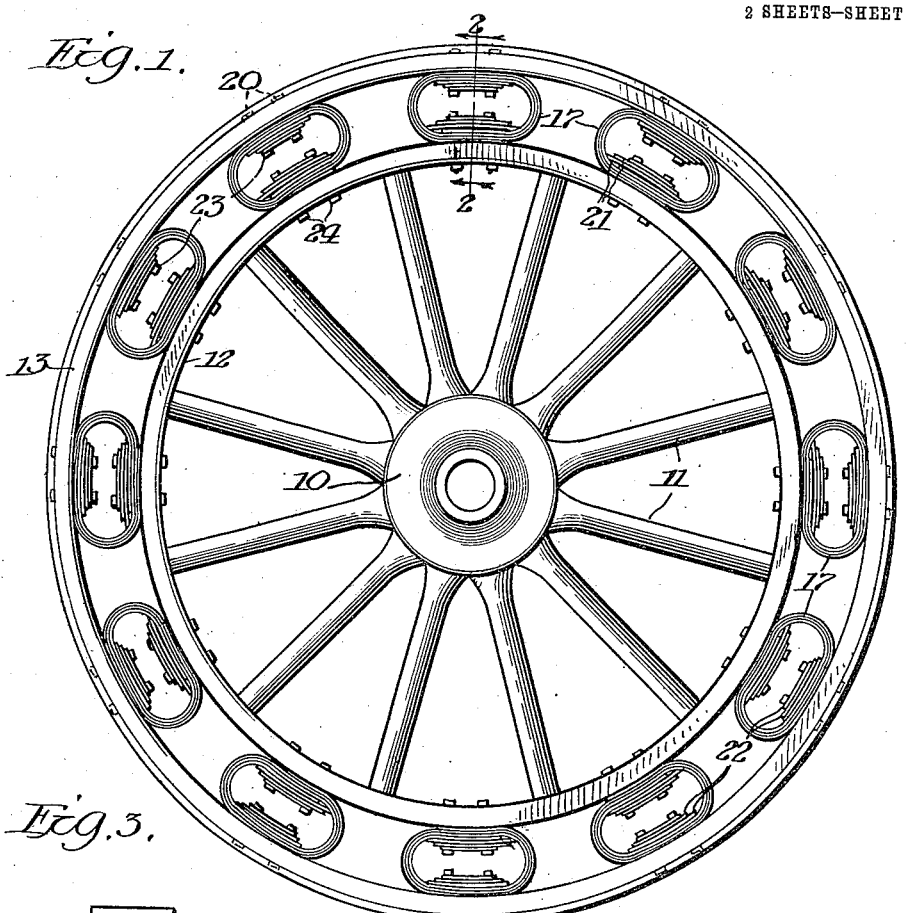

1,034,736.

Patented Aug. 6, 1912.
2 SHEETS—SHEET 2.

Witnesses

Inventor
Herschel A. Schermerhorn
by Chas. C. Tillman
Atty.

UNITED STATES PATENT OFFICE.

HERSCHEL A. SCHERMERHORN, OF SHABBONA GROVE, ILLINOIS.

SPRING-WHEEL.

1,034,736. Specification of Letters Patent. Patented Aug. 6, 1912.

Application filed January 25, 1912. Serial No. 673,336.

*To all whom it may concern:*

Be it known that I, HERSCHEL A. SCHERMERHORN, a citizen of the United States, residing at Shabbona Grove, in the county of Dekalb and State of Illinois, have invented certain new and useful Improvements in Spring-Wheels, of which the following is a specification.

This invention relates to certain new and useful improvements in vehicle wheels, and has especial relation to wheels for use with automobiles where great strength and durability are required together with a high degree of resiliency, and it consists in certain peculiarities of the construction, novel arrangement, and operation of the various parts thereof, as will be hereinafter more fully set forth and specifically claimed.

The principal object of the invention is to furnish a wheel having a resilient or yielding portion as a part of its structure, whereby the jar produced by the inequalities of the road is not transmitted to the axle, but is wholly or partially absorbed by the resilient structure of the wheel.

Another object of the invention is to provide means whereby the spring members may be applied as units, when desired, between the rim and tire of the wheel and may be removed and replaced at will.

Still another object of the invention is to provide a resilient wheel which shall be simple and inexpensive in construction, strong, durable, and efficient in operation, and so made, as to afford a higher degree of resiliency than that furnished by a pneumatic tire, but without the employment of the same.

Other objects and advantages of the invention will be disclosed in the subjoined description and explanation.

In order to enable others skilled in the art to which the invention pertains, to make and use the same I will now proceed to describe it referring to the accompanying drawings, in which—

Figure 4:
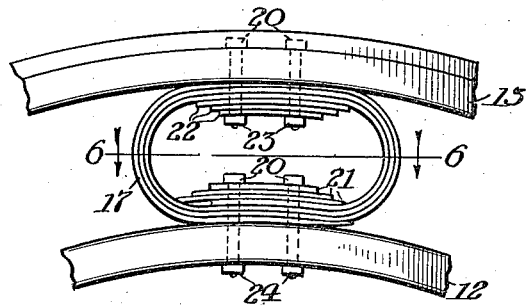
Figure 5:
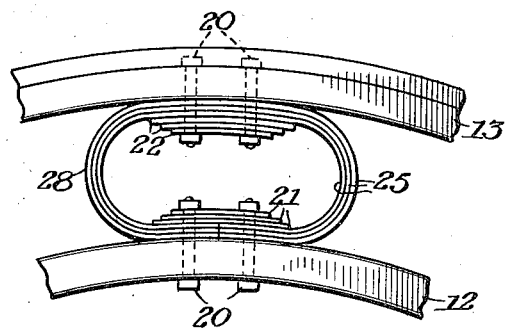
Figure 6:
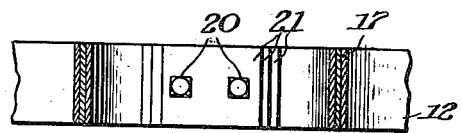
Figure 7:
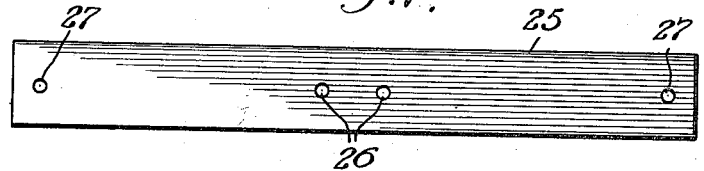

Figure 1, is a side view in elevation of a wheel embodying one form of the invention. Fig. 2, is an enlarged sectional view taken on line 2—2, of Fig. 1, looking in the direction indicated by the arrows, showing a portion of the rim and tire of the wheel with one of the springs interposed therebetween, and a portion of one of the spokes of the wheel. Fig. 3, is a plan view of a portion of a strip of metal out of which the springs are formed. Fig. 4, is a view in side elevation of a portion of the rim and tire of the wheel showing a spring interposed between the same and illustrating the manner of securing the latter to the former. Fig. 5, is a similar view of like parts showing a modification in the construction of the spring. Fig. 6, is a sectional view taken on line 6—6, of Fig. 4, looking in the direction indicated by the arrows, and Fig. 7, is a plan view of one of the members of the modified construction of the spring shown in Fig. 5.

Like numerals of reference refer to corresponding parts throughout the different views of the drawings.

The reference numeral 10, designates the hub of the wheel from which radiate spokes 11, of the ordinary or any preferred construction, to the outer ends of which is secured in any suitable manner the rim 12, of the wheel, which rim may be of any suitable material, and of any well known construction. Surrounding the rim 12, at a distance therefrom is the tire 13, which may be of any suitable material and construction, but preferably of metal, and provided on its outer periphery with a channel 14, which may be produced by means of narrow band-like strips 15, of metal shrunk or otherwise secured to the tire 13, at the edges thereof, as will be readily understood by reference to Fig. 2, of the drawings. The channel thus afforded may be utilized for the reception of a solid or hard tire 16, which may be placed between the bands or strips 15, and which will be held in position by reason of the dove-tail shaped channel 14, formed by said strips or bands. However, this portion as well as the strips or bands 15, of the tire may be omitted without departing from the spirit of the invention. Located between the inner surface of the tire 13, and the outer surface of the rim 12, are a series of elliptical springs 17, each of which is preferably formed of a single piece of resilient material or sheet steel 18, see Fig. 3, of the drawings, which piece is provided with a series of openings 19, arranged in pairs, as shown, so that when the strip 18, is curved said pairs of openings will register with the pairs of openings in the adjacent layer of the strip or piece out of which the spring is formed, to the end that, bolts 20, may be passed through said openings so as to secure the layers of each spring together. The bolts 20, are also passed through suitable openings in the rim 12, and tire 13, thus securing the spring 17, in position between the rim and tire is clearly shown in Figs. 1, 2, and 4, of the drawings.

Located on the inner surface of each of the springs 17, adjacent to the rim 12, are one or more metal plates 21, through which the bolts 20, are passed, and located on the inner surface of each of the springs 17, adjacent to the tire 13, are one or more metal plates 22, through suitable openings in which the bolts 20, in said tire pass and are secured by means of nuts 23, while the bolts 20, which are extended through the plates 21, and rim 12, are held in position by means of nuts 24, or otherwise. By this arrangement of the continuous strip 18, out of which each of the springs 17, is formed, and the location of the plates 21, and 22, on the inner yet opposite surfaces thereof, it is evident that the springs 17, will assume and maintain an elongated or elliptical shape between the rim 12, and tire 13, which will afford great strength, durability, and resiliency, and that as the said plates and layers of the springs are bolted to the tire and rim, by means of bolts arranged in pairs, any lateral movement of the tire with respect to the rim, will be prevented. In other words, the tire will be yieldingly held in the same plane with the rim.

In Figs. 5, 6, and 7, of the drawings, is shown a modification in the construction of the springs, which modified form may sometimes be employed, and which consists in forming each of the springs of a plurality of metal strips 25, each of which is provided with a series of openings 26, near their middle portions, and an opening 27, near each of its ends. These strips are placed one on the other so that the openings 26, and 27, in one of the strips will register with the openings 26, and 27, in the other strips, so that when the strips are curved so as to approximate their ends, bolts 20, may be passed through said openings, and through suitable openings in the rim 12, and tire 13, where they may be secured by means of suitable nuts on said bolts. In this modified construction, one or more plates 21, is or are located on the inner surface of each of the springs 28, adjacent to the rim 12, and one or more plates 22, are located on the inner surface of each of said springs adjacent to the tire 13, and are held in such positions by means of the bolts 20, as in the other or first above described construction.

Having thus fully described my invention what I claim as new and desire to secure by Letters-Patent is—

In a spring wheel, the combination with a rim, of a tire surrounding the same at a distance therefrom, a plurality of elongated springs interposed longitudinally between said rim and tire and each consisting of a single piece of metal bent to form a plurality of contacting members, a plurality of segmental plates located on the inner surface of each of said springs adjacent to said rim and a plurality of segmental plates located on the inner surface of each of said springs adjacent to said tire, the curves of said plates being disposed outwardly, a plurality of bolts extended through that portion of each of the springs adjacent to the rim and through the plates on said portion and engaging the rim, and a plurality of bolts extended through that portion of each of said springs adjacent to the tire and through the plates located on said portion of the spring and engaging the tire, said bolts being arranged one after the other longitudinally with respect to their respective spring and circumferential with respect to the rim and tire.

HERSCHEL A. SCHERMERHORN.

Witnesses:
CHAS. C. TILLMAN,
E. NEWSTROM.

---

Copies of this patent may be obtained for five cents each, by addressing the "Commissioner of Patents Washington, D. C."